United States Patent
Turunen

(10) Patent No.: US 7,289,792 B1
(45) Date of Patent: Oct. 30, 2007

(54) METHOD FOR TRANSMITTING MULTIMEDIA MESSAGES AND A MULTIMEDIA MESSAGE COMMUNICATION SYSTEM

(75) Inventor: Matti Turunen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/318,372

(22) Filed: May 25, 1999

(30) Foreign Application Priority Data

May 27, 1998 (FI) ...................................... 981184

(51) Int. Cl.
*H04M 3/42* (2006.01)
*H04L 12/16* (2006.01)

(52) U.S. Cl. ............................... 455/414.1; 455/412.2; 455/435.1; 370/254; 370/259

(58) Field of Classification Search ................ 370/329, 370/389, 352–356, 386, 397, 400, 401, 474, 370/351, 316, 328, 254, 410, 259, 310; 455/412.2, 455/414.1, 414.3, 3.01, 413, 433, 466, 418, 455/432.3, 435.1, 414.4, 412.1, 419, 452.1, 455/517, 515, 420, 415, 446
See application file for complete search history.

(56) References Cited

U.S. PATENT DOCUMENTS

| | | | | |
|---|---|---|---|---|
| 5,257,257 A | | 10/1993 | Chen et al. ..................... 370/18 |
| 5,640,395 A | | 6/1997 | Hamalainen et al. ....... 370/322 |
| 5,708,655 A | * | 1/1998 | Toth et al. ................... 370/313 |
| 5,729,534 A | | 3/1998 | Jokinen et al. ............. 370/280 |
| 5,729,541 A | | 3/1998 | Hamalainen et al. ....... 370/337 |
| 5,790,534 A | | 8/1998 | Kokko et al. ................ 370/335 |
| 5,797,094 A | * | 8/1998 | Houde et al. ............. 455/412.2 |
| 5,802,465 A | | 9/1998 | Hamalainen et al. ....... 455/403 |
| 5,956,729 A | * | 9/1999 | Goetz et al. ............. 707/104.1 |
| 6,061,346 A | * | 5/2000 | Nordman et al. ........... 370/352 |
| 6,163,532 A | * | 12/2000 | Taguchi et al. ............. 370/338 |
| 6,278,706 B1 | * | 8/2001 | Gibbs et al. ................. 370/352 |
| 6,333,919 B2 | * | 12/2001 | Gaffney et al. ............. 370/254 |
| 6,351,522 B1 | * | 2/2002 | Vitikainen .................. 379/67.1 |
| 6,396,828 B1 | * | 5/2002 | Liu ............................ 370/352 |

FOREIGN PATENT DOCUMENTS

| | | |
|---|---|---|
| EP | 0798899 A1 | 10/1997 |
| WO | WO 96/36142 | 11/1996 |

OTHER PUBLICATIONS

Finnish Office Action.

* cited by examiner

*Primary Examiner*—Edward F. Urban
*Assistant Examiner*—John J. Lee
(74) *Attorney, Agent, or Firm*—Perman & Green, LLP

(57) ABSTRACT

The invention relates to a method for transmitting multimedia messages to a wireless terminal (MS1) in a data transmission system which comprises at least one mobile communication network (HPLMN) and at least one multimedia message server (MMSV). In the method, each wireless terminal (MS1) connected to the mobile communication network (HPLMN), is allocated an address specifying said wireless terminal (MS1), and at least one data transmission connection is activated for said wireless terminal (MS1). Information on the activation of the data transmission connection for said terminal (MS1) is transmitted to the multimedia message server (MMSV).

12 Claims, 6 Drawing Sheets

METHOD FOR TRANSMITTING MULTIMEDIA MESSAGES AND A MULTIMEDIA MESSAGE COMMUNICATION SYSTEM

FIELD OF THE INVENTION

The present invention relates to a method for transmitting multimedia messages. The invention also relates to a multimedia message communication system, a multimedia message server, and a multimedia terminal.

BRIEF DESCRIPTION OF RELATED DEVELOPMENTS

In e-mail systems, it is possible to transmit messages between terminals. E-mail systems have been primarily only used the transmission of fairly short messages in text form from a source terminal to a destination terminal, but with the increase in multimedia applications, a need has arisen to transmit also other messages than those in text form. In this specification, such multimedia messages refer to the transmission of images, audio, video, files and other binary data in a so-called store-and-forward fashion. This store-and-forward fashion means that when the recipient is coupled to an e-mail network, the message is transmitted to the recipient immediately, and when the recipient is not coupled to the e-mail network the message is stored in an e-mail server. In this latter case, the aim is to transmit the message to the recipient later when the s/he is coupled to the e-mail network.

The quantity of information contained in multimedia messages can vary widely, for instance according to the type of information in question. For example in the case of so-called still images, the typical quantity of data is in the order of 50 kilobytes to a few hundred kilobytes. However, in audio and video messages, the quantity of information can be considerably larger than this. In this specification the term "multimedia terminal" will be used for such a terminal with which this kind of multimedia information can be processed.

In order to make mobility possible, the terminal can be provided in connection with a wireless communication device, wherein the terminal can be in a data transmission connection via a mobile communication network for example to the Internet data network. This can be implemented, for example, by using a packet format data transmission system GPRS (General Packet Radio Service) developed for the GSM mobile communication system. The term "packet radio system" is also used for such wireless packet switched system utilizing radio data transmission.

Several principles are known in the transmission of e-mail messages. A message can be composed for example in such a way that at the transmission stage, the e-mail message is supplemented with annexed files containing the actual multimedia information. When transmitting the message, it is typically divided into packets according to a packet data protocol, for example into packets according to the Internet protocol (IP), which are transmitted in the e-mail network to the recipient defined in the message. One such data network suitable for transmission of e-mail messages is the Internet data network. The Internet data network is composed of networks arranged in a hierarchy, for example local area networks (LAN), regional telecommunication networks and international telecommunication networks. These data transmission networks are connected internally and externally with routers, which transmit information from the source terminal or from the preceding router in the data transmission chain and route the data to the destination terminal, or to the router located next in the data transmission chain. The Internet data network is also used for transmission of information other than e-mail messages.

Due to the fact that open data systems have become increasingly common, the TCP/IP (Transmission Control Protocol/Internet Protocol) connection protocol has developed into a widely used protocol, by means of which computers of different sizes and makes can communicate with each other. TCP/IP support is currently available for nearly all operating systems. The network layer protocol IP, Internet Protocol, of the TCP/IP is intended to be routed by gateways, i.e. routers. Routing is conducted by means of IP addresses and routing tables.

An Internet terminal connected to the Internet data network has a specified Internet address, which can either be static or dynamic, wherein when dynamic, it is produced for example with a dynamic host configuration protocol (DHCP) in that local area network server to which the terminal is being connected The IP defines the data transmission in packets, which makes a burst transmission possible. Thereby the same data transmission channel can be used in several connections simultaneously by sending the packets of different connections in different time slots.

In packet transmission according to the Internet protocol, it is possible to transmit the packets directly to the recipient only when the network parts of the addresses of both the sender and the recipient are the same. Otherwise, the packets are transmitted to a router, which is responsible for transmitting packets further, either to a next router or to the recipient, if the recipient is in the network of the router. In each router, the header field of the packets entering the router is examined, and on the basis of the address information contained in it, it is determined where the packet is to be transmitted. Packets transmitted via the same route form a so-called data transmission stream. Since the Internet protocol is characteristically a connectionless protocol, the above presented procedures have to be conducted for each packet entering the router.

E-mail systems typically comprise one or more e-mail servers for the purpose of e.g. routing the departing e-mails forward, and receiving and storing such e-mails which are addressed to a recipient logged in the e-mail server in question. This kind of an e-mail server can be, for example, a server located in the internal local area network of a company and having also e-mail server functions. It is, however, possible that the e-mail server is a separate server in the local area network, but this not significant with respect to applying the present invention.

Each user utilizing the e-mail system is allocated an individual e-mail address. The manner of representing this address can vary in different e-mail systems. For example in the Internet data network, a common representation of the address is the following: "firstname.lastname@ organization.firm.country". In the address, the part following the symbol © defines the domain and the first part of the address defines the recipient in that domain.

Some GSM mobile communication network operators provide an e-mail service, by means of which mobile subscribers entered in the mobile communication network of the operator can have the use of an e-mail address of their own. This e-mail address is composed, for example, of the telephone number of the mobile subscriber supplemented with the symbol @, and the domain address, which specifies the mobile operator. An example of such an e-mail address is "040-123456@inet.tele.fi". The representation of the address can be advantageously selected by the mobile operator. One alternative address format that can be used is the format "firstname.lastname@inet.tele.fi", more familiar from the Internet network. An e-mail address composed on the basis of a telephone number provides the advantage that when a telephone number is known, it is easy to conclude the corresponding e-mail address. If a name-based addressing format is used, the sender has to know the e-mail address of the recipient, or the operator of the mobile communication network can provide a service in which the corresponding e-mail address can be determined on the basis of the telephone number. this can also be implemented for example by using a so-called directory service LDAP (Lightweight Directory Access Protocol), wherein telephone numbers and the corresponding e-mail addresses in the operating range of the mobile operator in question are stored for example in the e-mail server. It is also possible to link the directory services of different mobile operators, wherein address resolution requests can be transmitted between the e-mail servers of different mobile operators to the e-mail server of the mobile operator, in which the home network of the requested mobile subscriber is located. One possible globally applicable e-mail address format of the GPRS system could be the following: "telephone number@GPRS.operator. country".

GPRS is a new GSM service, by means of which GSM users can be provided with a packet radio function. The GPRS allocates radio resources only when there is something to be transmitted, wherein the same resources are divided among all mobile stations according to the need. The conventional circuit switched network of the GSM system is designed for circuit switched speech transmissions, whereas the primary aim of the GPRS service is to implement the coupling from a mobile station to a public data network by using known protocols, such as TCP/IP, X.25 and CLNP. However, there is a connection between the packet switched GPRS service and circuit switched services of the GSM system. On the physical channel, resources can be used again and certain signallings can be shared. On the same carrier, it is possible to allocate time slots for circuit switched operation and packet switched GPRS operation.

FIG. 1 presents telecommunication network connections in the packet switched GPRS service. The main element in the network infrastructure for GPRS services is a GPRS support node, so-called GSN. It is a mobility router which implements coupling and co-operation between different data networks, for example to the public switched packet data network PSPDN via a connection Gi, or to the GPRS network of another operator via a connection Gp. It also implements mobility management together with GPRS registers via a connection Gr and transmission of data packets to mobile stations MS irrespective of their location. Physically, the GPRS support node GSN can be integrated with a mobile switching center MSC, or it can be a separate network element based on the architecture of data network routers. The user data is passed directly via a connection Gb between the support node GSN and a base station system BSS formed of base stations BTS and base station controllers BSC, but in between the support node GSN and the mobile switching center MSC there is a signalling connection Gs. In FIG. 1, solid lines between blocks illustrate data communication and broken lines illustrate signalling. Physically, data can be passed transparently via the mobile switching center MSC. The radio interface between the base station BTS and the mobile station MS is marked with the reference Um. The references Abis and A illustrate respectively the interfaces between the base station BTS and the base station controller BSC and between the base station controller BSC and mobile switching center MSC, which is a signalling connection. The reference Gn illustrates the connection between different support nodes of the same operator. The support nodes are typically divided into gateway GPRS support nodes GGSN (Gateway GSN) and serving i.e. home support nodes SGSN (Serving GSN) as presented in FIG. 1.

FIG. 2 presents a system composed of the Internet data network, a GPRS packet radio system PLMN (Public Land Mobile Network), a local area network LAN in a firm, and an e-mail server MSV of a mobile operator. At present, the GPRS packet radio system provides only a short message service SMS in message transmission. Since multimedia messages are, however, consirerably longer than the data that can be transmitted in short messages, this short message service cannot be applied to multimedia message communication in systems of prior art.

In the following, a situation will be described in which an e-mail message is transmitted from the outside of the GPRS network PLMN to the wireless terminal MS1 of the user. The sender of the e-mail message defines the address of the recipient, types the message s/he wishes, and possibly encloses attached files to be transmitted with the e-mail message. This can be conducted for example by means of an e-mail program or a WEB browser program in the terminal TE1. The message is transmitted to a server SV1 in the local area network LAN of the firm, which routes the message to the Internet network NW. In the Internet network NW, the e-mail message is routed on the basis of the destination address, via one or more routers, in the example of FIG. 2, to the e-mail server MSV of a mobile operator. The e-mail server MSV receives the e-mail message and stores it in its memory means (not shown). In the next phase, the e-mail server MSV examines whether the terminal MS1 of the recipient is logged in the GPRS network at that moment, and whether it has active packet data connections. This examination can be conducted for example in such a way that the e-mail server MSV transmits a query message to a name server DNS attached to the GPRS system. If the wireless terminal MS1 of the recipient is connected to the GPRS network PLMN, and has an active packet data connection, the name server DNS transmits to the e-mail server an acknowledgement message, with which it indicates the IP address of the wireless terminal MS1 of the user. If the wireless terminal MS1 of the user is not connected to the GPRS network at that moment, the e-mail server MSV transmits the query message again later. If a static IP address is determined in the wireless terminal MS1 of the recipient, the e-mail server MSV can transmit IP query packets to this IP address, wherein the wireless terminal MS1 of the recipient transmits an acknowledgement message to the e-mail server MSV. If no acknowledgement message is received, e-mail messages cannot be transmitted to the wireless terminal MS1 of the recipient at that moment. Also in this alternative, query messages have to be transmitted repeatedly, if the wireless terminal MS1 of the recipient is not coupled. This above presented polling causes an unnecessary load on the data network and on the capacity of the GPRS network and delays in the e-mail message transmission, especially if the wireless terminal MS1 of the user is not connected to the GPRS network at the moment of query. In that case, the e-mail message can be transmitted to the destination only after the wireless terminal MS1 of the recipient has first logged in the GPRS network and activated a packet data connection, after which, at some stage, the e-mail server MSV transmits a query message. In systems of prior art, the e-mail server MSV has no possibility of defining the coupling of the recipient to the GPRS network except by polling.

SUMMARY OF THE INVENTION

One purpose of the present invention is to provide a method for transmitting multimedia messages to a wireless terminal as soon as possible after a packet data connection to the packet radio network is activated in the wireless terminal, a multimedia message communication system applying the method, and a multimedia terminal. The invention is based on the idea that the gateway support node of the packet radio network transmits to the multimedia message server information on the activation of the packet data connection in the wireless terminal. After this, multimedia messages are transmitted utilizing the features of the e-mail system. The present invention includes a method for transmitting multimedia message, a multimedia message communication system, a multimedia message server, and a multimedia terminal as recited by the claims.

With the present invention, considerable advantages are achieved compared with solutions of prior art. In the multimedia message communication system implemented with the method according to the invention, it is possible to make the messages reach their destination faster, especially in situations when the destination terminal is not connected to a packet radio network or does not have active packet data connections at that moment when the message is transmitted. Thus, in the system according to the invention, unnecessary query messages need not be transmitted, which decreases the load on the multimedia message server and deallocates resources for other purposes. Thus, it is possible to give more connection time to other possible data transmission connections. The multimedia message communication system according to the invention is based on existing e-mail protocols, wherein it can be advantageously implemented in current e-mail systems.

BRIEF DESCRIPTION OF THE DRAWINGS

In the following, the invention will be described with reference to the appended figures, in which.

Figure 1:
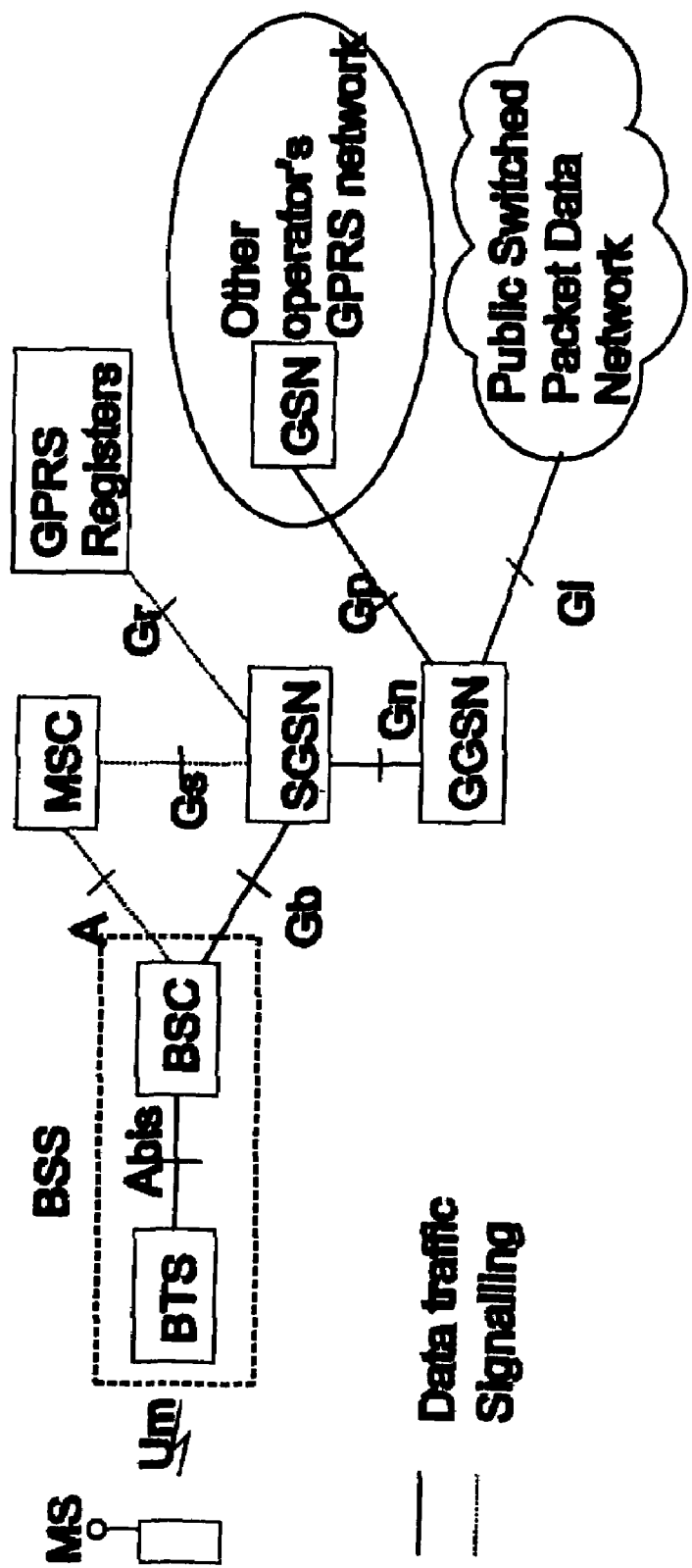
FIG. 1 shows the structure of a telecommunication network in GSM GPRS packet radio service data transmission.
Figure 2:
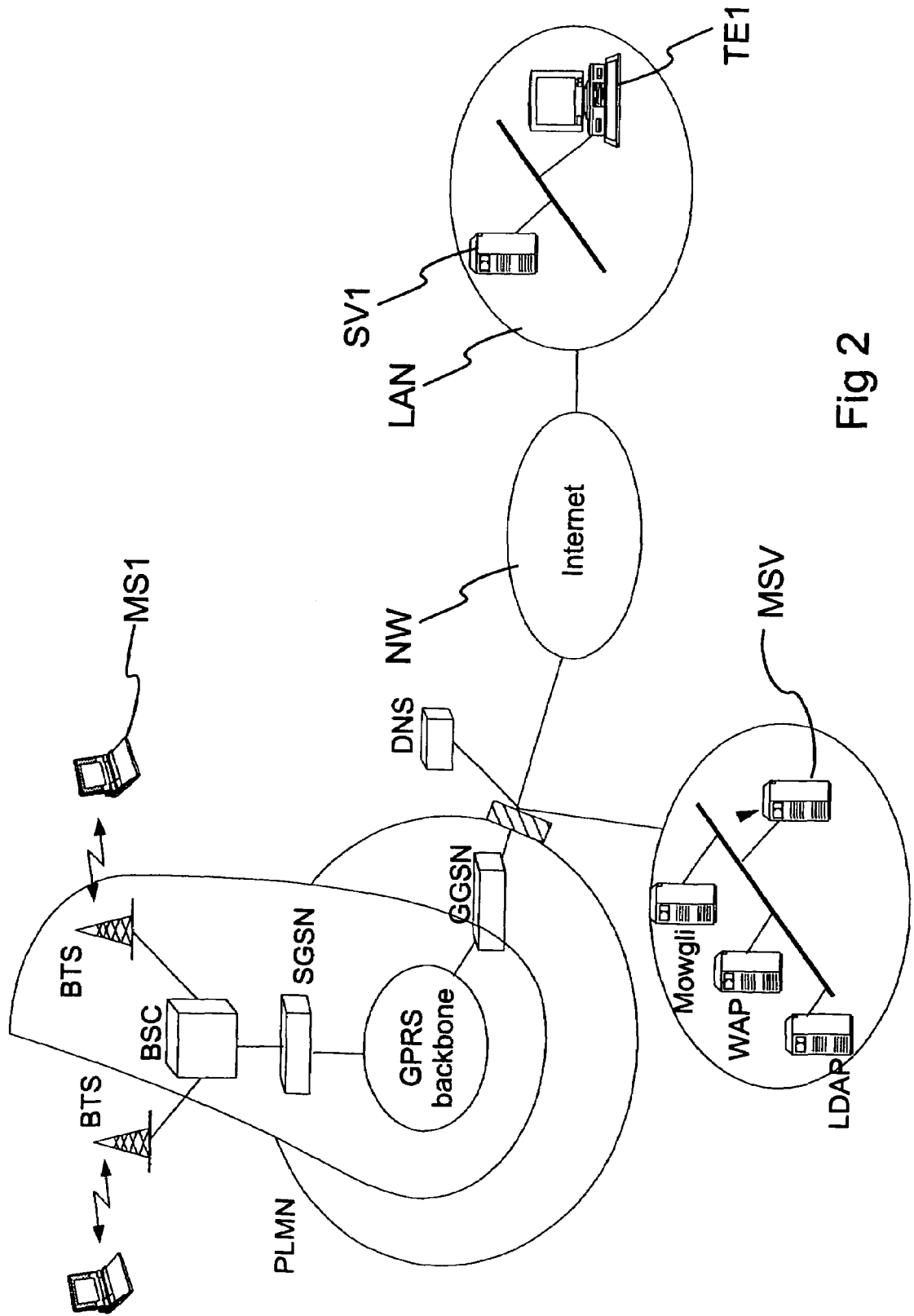
FIG. 2 shows an e-mail system in a reduced manner.

To understand the invention, it will be described in the following with reference to a packet radio system of prior art in FIG. 1 and to a multimedia message communication system according to a first preferred embodiment of the invention in FIG. 3. The descriptions are also suitable for application examples when the application environment of the invention is advantageously similar.

Figure 3:
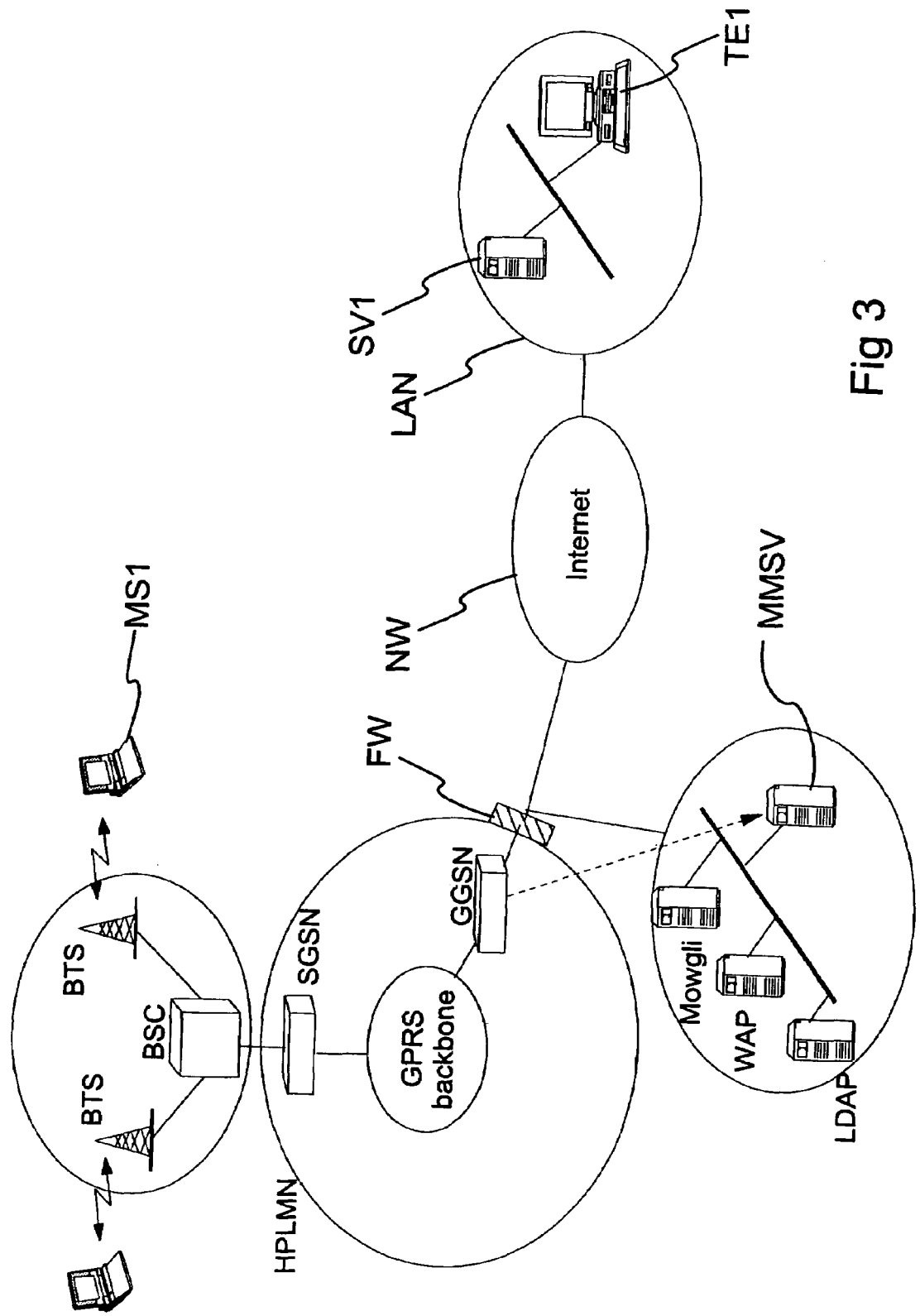
FIG. 3 shows a multimedia message communication system according to a preferred embodiment of the invention.

FIG. 3 presents a multimedia message communication system according to a preferred embodiment of the invention, comprising a packet radio network HPLMN, which is for example the GPRS network of the GSM mobile communication system. This packet radio network HPLMN is coupled into a data transmission connection with the Internet data network NW via a gateway support node GGSN. In addition, the multimedia message communication system comprises a multimedia message server MMSV, which is, for example, an e-mail server of the system according to FIG. 1, supplemented with features according to the invention, which will be discussed below in this description. The multimedia message server MMSV is, for example, a server maintained by the operator of the packet radio network. The multimedia message server is arranged in a data transmission connection to the Internet data network NW and the gateway support node GGSN of the packet radio network. In addition, FIG. 3 shows a local area network of a firm, which is also connected to the Internet data network NW via a server SV1.

A wireless terminal MS1 comprises, for instance, mobile station and data processing features. This kind of wireless terminal MS1 can consist of, for example, a mobile station which is connected to a portable computer. Another alternative is to connect a GSM mobile station manufactured in PCMCIA card format to a portable computer. The manner in which the wireless terminal MS1 according to the invention is implemented, is not significant with respect to applying the invention. The wireless terminal MS1 contains an application program for transmission and automatic reception of e-mails, such as an application program according to an SMTP protocol (Simple Mail Transfer Protocol). In addition, the wireless terminal advantageously contains an application program, such as an application program according to IMAP protocol, intended for retrieving e-mails from an e-mail server MMSV.

DETAILED DESCRIPTION OF THE PREFERRED EMBODIMENTS

Figure 4:
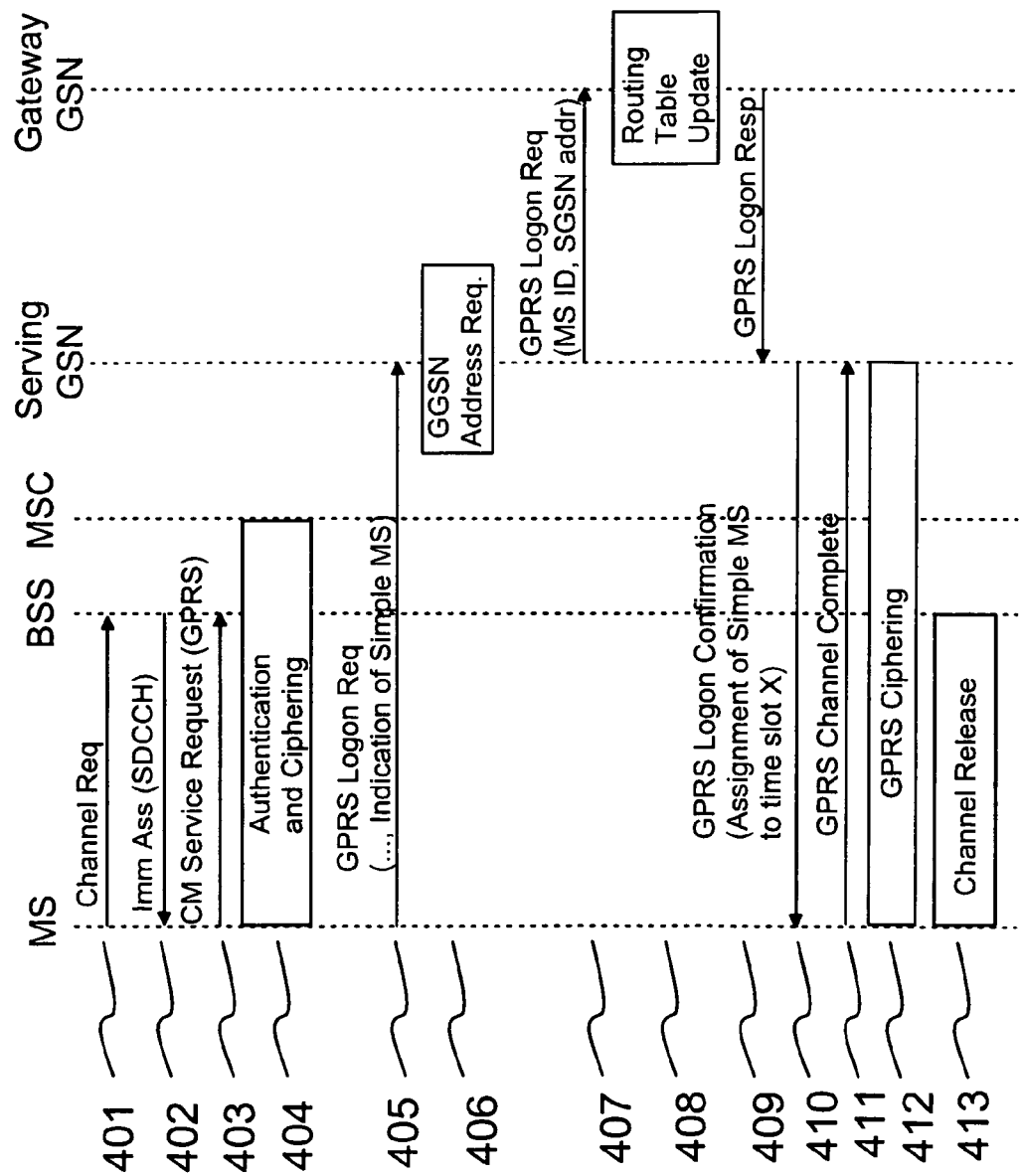
FIG. 4 shows an example of signalling when a wireless terminal is logging in to a network.

FIG. 4 presents in an arrow diagram an example of the different stages when the wireless terminal MS1 is logged in to the network as the wireless terminal MS1 is switched on. At first, the wireless terminal MS1 and the GPRS network are synchronized, which is conducted in a way corresponding to conventional circuit switching in the GSM mobile communication network. When the wireless terminal MS1 is to be registered for a packet radio function, such as the use of GPRS service, it starts a specified logon process, a so-called GPRS logon process. First, the wireless terminal MS1 transmits a channel allocation request for radio traffic to the base station system (stage 401). The base station system BSS acknowledges the request (stage 402), after which the wireless terminal MS1 transmits a request for packet service to the base station system BSS (stage 403). After that, in the mobile switching center MSC, the wireless terminal (MS1) is authenticated and the encryption key is exchanged (stage 404) between the wireless station MS1 and the network, as is known for example from the GSM system. Next, the wireless terminal MS1 transmits a logon request for packet services to the serving packet service support node SGSN (stage 405). The request contains, for instance, the identification of the wireless terminal MS1 and parameter data for encryption. The serving packet service support node SGSN conducts an address request process to the gateway support node GGSN (stage 406). The serving packet service support node SGSN transmits a logon request for packet services to the gateway support node GGSN (stage 407), which registers the location of the wireless terminal MS1 by updating the routing table (stage 408) and replies to the logon request (stage 409). Thus, the serving packet service support node SGSN confirms to the wireless terminal MS1 the logon to the packet services (stage 410), wherein it gives the wireless terminal MS1 a temporary logical link identity TLLI to be used as an address in data transmissions between the wireless terminal MS1 and the serving support node SGSN. This TLLI identification is used in the air interface Um of the packet radio to identify the wireless terminal MS1. The logon confirmation message from the serving support node SGSN to the wireless terminal MS1 typically also contains a wireless terminal MS1 identification and a cell identification (in the range of which the wireless terminal MS1 is located). Referring to stage 410, it is known from circuit switched technics that the wireless terminal MS1 is allocated a specified channel, in other words a specified time slot of the TDMA frame to be used for transmission and reception, i.e. the channels of the up-link and the down-link are provided in pairs. In the GSM GPRS packet service, the support node SGSN provides the wireless terminal MS1 with information on one or more channels of the down link, to be used in the communication of the down link. The wireless terminal MS1 indicates that it is ready for the packet service connection (stage 411), after which the encryption parameters are exchanged for the packet services between the wireless terminal MS1 and the serving support node SGSN (stage 412). After this, the wireless terminal MS1 moves into a wait state, wherein the channel is deallocated (stage 413).

The wireless terminal MS1 is allowed to use the channel again as soon as it has anything to transmit, wherein it transmits to the network (base station) a so-called packet random access burst PRA as a channel allocation request, which can also be called a channel allocation burst. The wireless terminal MS1 can transmit the channel allocation burst PRA on a logical allocation channel (so-called PRA channel) in the time slot reserved for it. The network acknowledges the request by transmitting a packet access grant PAG to the wireless terminal MS1.

Figure 5A:
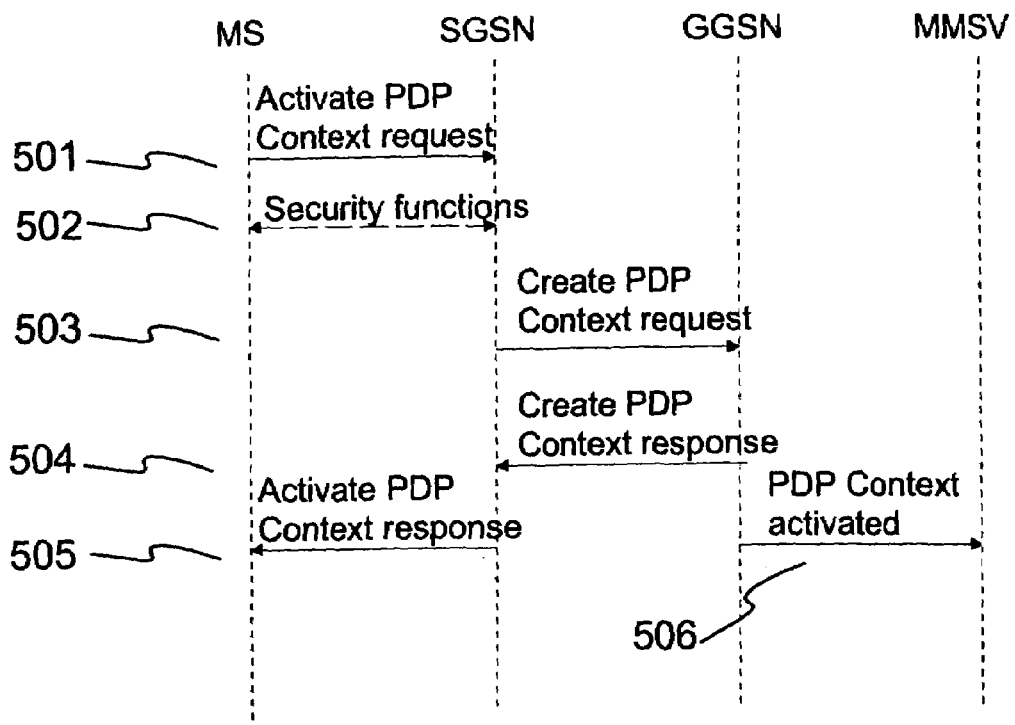
FIG. 5a shows an example of signalling when the wireless terminal activates a packet data connection to a network.

The above described stages presented in FIG. 4 are defined in the GSM GPRS packet service specifications GSM 03.60 and are known as such by anyone skilled in the art. In a system similar to that of FIG. 4, the up-link transmissions, i.e. from the wireless terminal MS1 towards the base station BTS, and the down-link transmissions, i.e. from the base station BTS towards the wireless terminal MS1, are independent of each other. At this stage, the wireless terminal MS1 can transmit and receive short messages, but packet format data transmission is not yet available. This is achieved with so-called activation signalling of the packet data connection, which is presented in the reduced arrow diagram in the appended FIG. 5a. The wireless terminal MS1 starts to activate the packet data connection by transmitting an activation request for the PDP connection to the serving support node SGSN (stage 501). The request message also contains parameters for identifying the transmitting terminal and defining the desired connection type. Next, the serving support node SGSN authenticates the wireless terminal MS1 and exchanges the encryption key (stage 502). After this, the serving support node SGSN checks that the wireless terminal MS1 is entitled to establishing a packet data connection according to the parameters it has transmitted, wherein the serving support node SGSN establishes a connection identification TID for the connection and transmits a packet data connection set-up request to the gateway support node GGSN (stage 503). The gateway support node GGSN either selects the dynamic address (PDP address) to be used in the packet data connection or, if a static address is allocated for the wireless terminal MS1, the gateway support node GGSN uses this address. In addition, the gateway support node supplements its packet data connection table with the data on this new connection, on the basis of which the gateway support node GGSN routes the incoming and outgoing packets of the packet data connection. The gateway support node GGSN transmits a reply message to the serving support node SGSN (stage 504), which contains information on whether the connection has been activated or not. The serving support node SGSN transmits to the wireless terminal MS1 an acknowledgement message on the activation of the packet data connection (stage 505). In the acknowledgement message, information on the activated packet data connection is transmitted in parameters to the wireless station MS1. The above described stages are known as such from the GPRS packet radio network. Furthermore, in the method according to a preferred embodiment of the present invention, message communication of the activation of the packet data connection is performed preferably in such a way that the gateway support node GGSN further transmits an identification of the wireless terminal MS1, such as the international mobile subscriber identity IMSI, and the IP address of the wireless terminal to the multimedia message server MMSV (stage 506). The e-mail addresses of the terminals determined in the multimedia message server are typically defined at the stage when the user makes a contract on the use of e-mail with the network operator. This e-mail address, as well as the identification of the wireless terminal, such as a telephone number MSISDN and/or a device identification IMSI, are stored in the multimedia message server MMSV. After receiving, in the activation message, information on the IP address allocated for the packet data connection of the wireless terminal MS1 in question, the multimedia message server MMSV is now capable of linking the e-mail address, the IP address to be used in the packet data connection, and the corresponding identification of the wireless terminal MS1 in the packet radio network HPLMN. Thus, the multimedia message server MMSV can define the wireless terminal MS1 of the right recipient on the basis of the e-mail address contained in the e-mail messages transmitted in the Internet data network. The multimedia message server MMSV is advantageously provided with a so-called mailbox for each such e-mail address which has the packet radio network HPLMN connected to this multimedia message server MMSV as its home network. It is obvious that this multimedia message server MMSV can contain mailboxes also for e-mail addresses outside the packet radio network. This database contains advantageously information stored, for each e-mail address, on whether there are active packet data connections in the e-mail address in question. In this situation, on the basis of the message received, the multimedia message server MMSV sets state information for said wireless terminal MS1 to indicate that it has an active packet data connection.

Figure 5B:
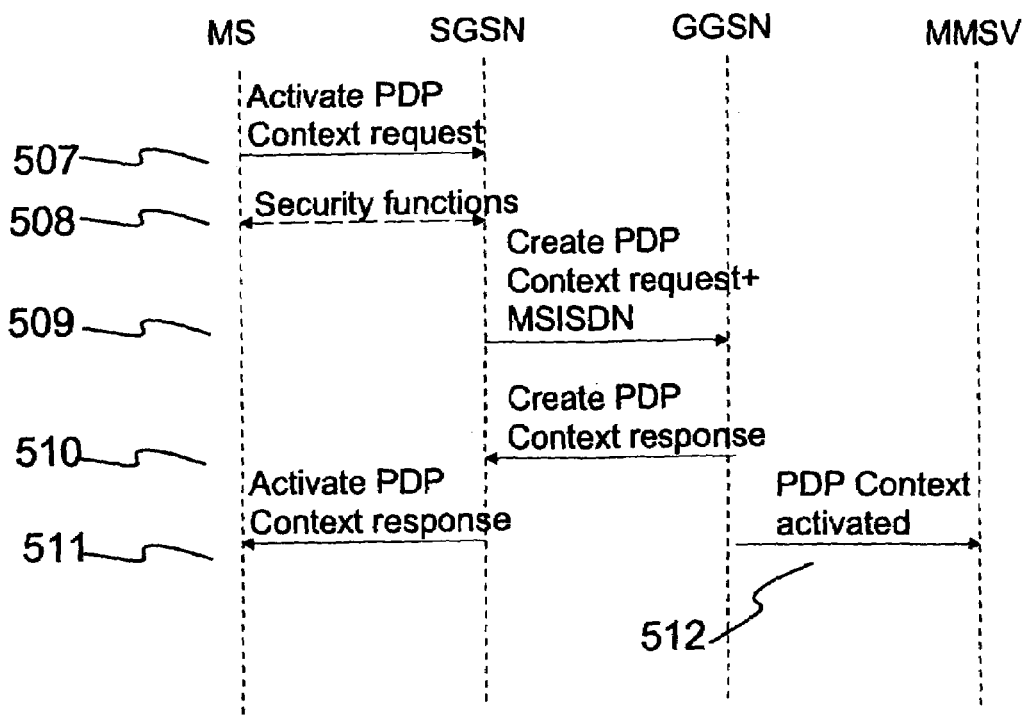
FIG. 5b shows a second example of signalling when the wireless terminal activates a packet data connection to a network.

In the above presented signalling, it is also possible to use the phone number MSISDN of the wireless terminal instead of the international mobile subscriber identity IMSI to specify the wireless terminal MS1. This alternative is shown in the arrow diagram of the appended FIG. 5b, in which the different stages 507-512 largely correspond to stages 501-506 in FIG. 5a. The most substantial differences are to be found at stage 509, which corresponds to stage 503 in FIG. 5a. However, in the GPRS system, the gateway support node GGSN does not normally have access to the phone number MSISDN of the wireless terminal, and therefore the serving support node SGSN has to transmit the phone number MSISDN of the terminal to the gateway support node GGSN. This can be performed for example by means of a field attached to the activation message of the packet data connection, or using a private extension field contained in the activation message. A further possibility is that the gateway support node GGSN defines the phone number MSISDN of the wireless terminal from a home location register (HLR). This, however, requires more processing capacity in the gateway support node GGSN and loads it more.

In the following, a situation will be described, in which a multimedia message is transmitted from outside of the packet radio network HPLMN to a recipient who has an e-mail address in the packet radio network HPLMN. The sender of the message uses a terminal TE1 to define the e-mail address of the recipient, types the message s/he wishes, and encloses multimedia information to be transmitted, such as a video recording or a still image file. The message is advantageously converted to a form corresponding to a protocol known as such, and transmitted in a local area network LAN of a firm to a server SV1, which routes the message to the Internet network NW. The data transmission protocol intended for the transmission of e-mail messages is the SMTP protocol. In the Internet network NW, the multimedia message is transmitted on the basis of the IP address of the recipient via one or more routers, in the example of FIG. 3, to the multimedia message server MMSV of a mobile operator. The multimedia message server MMSV receives the multimedia message and stores it in a mailbox established in its memory means (not shown). In the next phase, the multimedia message server MMSV examines on the basis of the IP address, whether the wireless terminal MS1 of the recipient is logged in to the GPRS network, and whether it has active packet data connections. This can be implemented advantageously by examining from the database established in the multimedia message server MMSV the state information of the IP address contained in the multimedia message. Thus, it is not necessary for the multimedia message server to perform polling. If the wireless terminal MS1 of the recipient is connected to the GPRS network and has an active packet data connection, the multimedia message server transmits a message via the gateway support node GGSN to the packet radio network HPLMN, in which the message is routed via the serving support node SGSN to the base station system BSS, to which the wireless terminal MS1 is coupled at that moment. If the wireless terminal MS1 is not coupled to the packet radio network HPLMN or it does not have active packet data connections, the multimedia message server does not transmit the message or pollings, but the message is stored in the memory means of the multimedia message server. The multimedia message server MMSV waits for information on the activation of the packet data connection, transmitted from the gateway support node GGSN, before the multimedia message server MMSV transmits the multimedia message to the packet radio network via the gateway support node GGSN.

Before transmitting the message to the packet radio network, the message is framed into packets according to the packet radio network by attaching, for instance, the address information of the packet radio network. In the packets of the packet radio network, the payload is the original IP packet and the IP addresses (destination/source) contained therein. In the wireless terminal MS1 receiving the message, the message is unpacked and restored into IP packets, i.e. the actual content of the message, in this example the IP packet, is separated from the packets of the packet network. For this type of framing, the term "tunneling" is also used. After unpacking the message, the type of the message is examined, and the content of the message is transmitted on the basis of the type to such an application program which is capable of processing the message. This application program is, for example, a browsing program for still images, wherein when the message contains still images, the content of the images can be represented with the display device of the wireless terminal MS1.

All the multimedia messages and other e-mail messages addressed to an e-mail address in the packet radio network are directed to the multimedia message server before the messages are transmitted to the packet radio network. The messages are transmitted for example via the Internet data network or from a packet radio network. The users of the multimedia message communication system can specify criteria in their mailbox, on the basis of which the multimedia message server determines which procedures are induced by each multimedia message incoming in the multimedia message server MMSV. The user can utilize for example a WEB browser program or a WAP browser program to determine that only certain types of multimedia messages are transmitted from the multimedia server MMSV automatically to the wireless terminal MS1 of the user when it has an active packet data connection. It is possible to define the type of the message from MIME type messages, on the basis of the type information contained in them. The user can also restrict automatic transmission on the basis of the sender, time, size, etc. If necessary, the user can prevent automatic transmission of all messages. Of messages, whose automatic transmission the user has prevented, the user can study e.g. header information, and retrieve the desired messages to the wireless terminal for instance by means of a program applying IMAP protocol. It can also be determined that the multimedia message server MMSV transmits to the wireless terminal MS1, for example in a short message, information on such messages, which have been received in the e-mail box of the user and for which automatic transmission is inhibited.

In a situation where the multimedia message server MMSV is aware that the wireless terminal MS1 of the user is logged in to the packet network HPLMN and that it has one or more active packet data connections, the multimedia message server examines the received messages to find out whether automatic transmission is allowed and transmits to the packet radio network, advantageously by means of the SMTP protocol, such messages for which the user has not prevented automatic transmission. These messages are transferred in the multimedia message server to an SMTP message sequence, and the multimedia message server MMSV advantageously establishes a connection according to the TCP protocol to the wireless terminal MS1 of the recipient of the messages. The wireless terminal MS1 only accepts a connection established by the multimedia message server MMSV in question. In this way it is possible to prevent interference caused by terminals of unauthorized users.

Figure 5C:
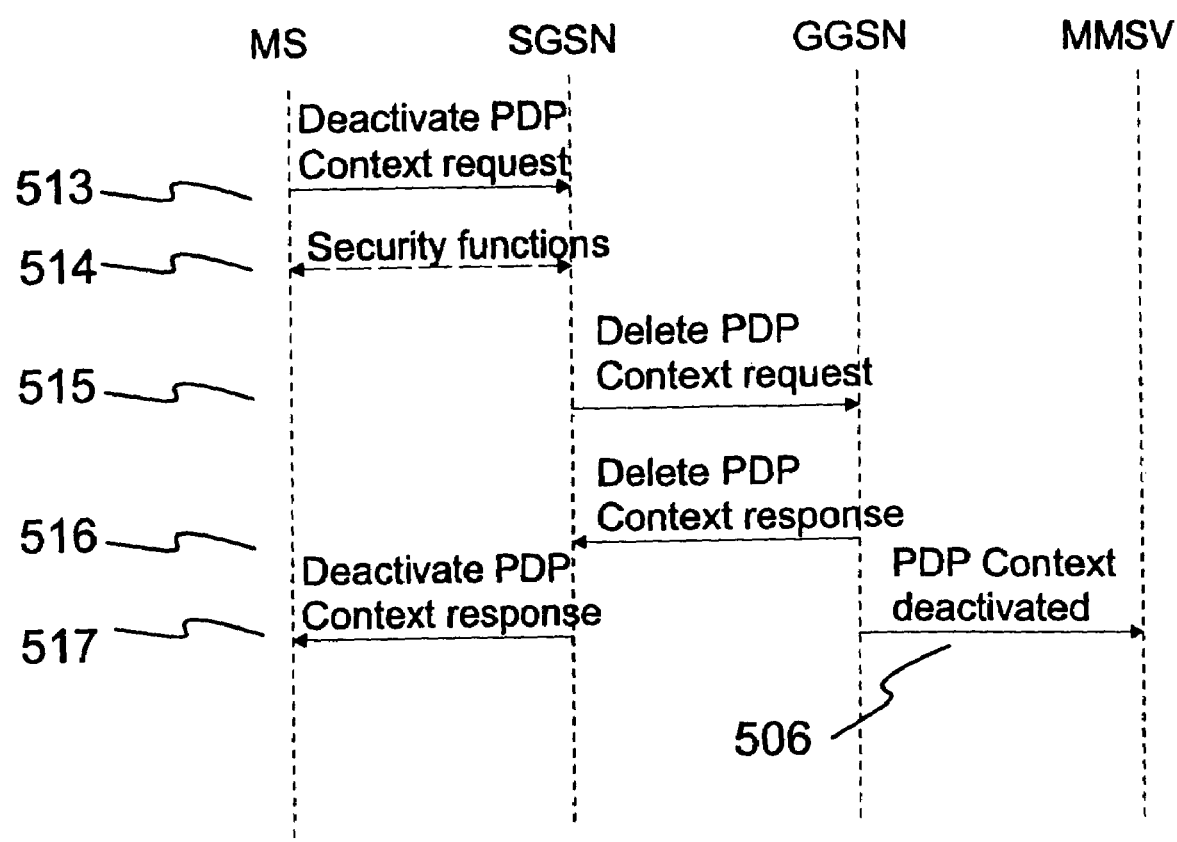
FIG. 5c shows an example of signalling when the wireless terminal deactivates a packet data connection.

In the foregoing, the activation of a packet data connection and its use in multimedia message communication has been described. Furthermore, a situation will be described, in which a user of the wireless terminal MS1 wishes to terminate, i.e deactivate a packet data connection. This is also shown in the arrow diagram of FIG. 5c in a reduced manner. A deactivation request (Deactivate PDP Context Request) is transmitted from the wireless terminal to the serving support node SGSN (stage 513). This deactivation request transmits, for instance, information on the temporary identification TLLI allocated for the wireless terminal MS1. At the next stage, the serving support node SGSN conducts, if necessary, authentication of the wireless terminal MS1 and exchange of the encryption key (stage 514). After this, the serving support node SGSN transmits a packet data connection delete message (Delete PDP Context Request) to the gateway support node GGSN, which deletes the data of the packet data connection to be deactivated. If the wireless terminal had the use of the dynamic address provided by the packet radio network in the deactivated packet data connection, this address is reallocated to the use of other packet data connections which are to be activated. The gateway support node GGSN transmits an acknowledgement message on the deactivation of the packet data connection (Delete PDP Context Response) to the serving support node SGSN (stage 515), which further informs the wireless terminal MS1 of the deactivation of the connection with a deactivation acknowledgement message (Deactivate PDP Context Response), as illustrated by stage 516 in FIG. 5c. The gateway support node GGSN also transmits information on the deactivation of the packet data connection to the multimedia message server MMSV (stage 517), which modifies in its own database the state information on the wireless terminal MS1 in question. If multimedia messages for this wireless terminal MS1 are received after that, the multimedia message server MMSV does not forward them to the wireless terminal MS1 until the next time that the gateway support node GGSN has informed the multimedia message server MMSV of the activation of the packet connection, as described above in this description.

Furthermore, the system according to FIG. 3 presents a so-called firewall, for the purpose of preventing unauthorized users from entering the packet radio network HPLMN, and on the other hand of restricting the entry of messages coming from outside of the packet radio network HPLMN in the packet radio network HPLMN. This firewall solution is known as such and need therefore not be discussed in more detail in this context.

It is also possible to apply the invention in wireless terminals with more restricted features, for example in connection with a conventional wireless telephone. For this, the system according to FIG. 3 presents a WAP proxy, for the purpose of e.g. generating a message communication mechanism for relatively short messages, by means of a so-called WAP protocol (Wireless Application Protocol). Furthermore, the system of FIG. 3 presents as an example a so-called Mowgli proxy, by means of which it is possible to enhance wireless communication. This WAP proxy and Mowgli proxy can be used to conduct protocol transforms. For example messages coming from the Internet network NW are first directed to the multimedia message server MMSV and after this, if desired, to the proxy, in which a protocol transform is conducted. Thus, the multimedia message server advantageously requires support only for the SMTP, IMAP, and HTTP (Hyper Text Transfer Protocol) data transmission protocols.

The invention is not restricted solely to the embodiments presented above, but it can be modified within the scope of the appended claims.

The invention claimed is:

1. A method for transmitting multimedia messages to a wireless terminal in a data transmission system which includes at least one mobile communication network and at least one multimedia message server, the method comprising:

specifying for each wireless terminal coupled to the mobile communication network, an address identifying said wireless terminal;

activating at least one data transmission connection for the wireless terminal;

informing the at least one multimedia message server of the activation of the data transmission connection for said wireless terminal; and upon informing the at least one multimedia message server of the activation of the data transmission connection, transmitting the multimedia messages to the wireless terminal using the activated data transmission connection;

wherein messages addressed to said wireless terminal are transmitted to the multimedia message server, and that before the multimedia messages received by the multimedia message server and addressed to the wireless terminal are transmitted to the wireless terminal, it is examined, whether there is an activated data transmission connection for said wireless terminal, if a data transmission connection is activated for said terminal, the multimedia messages are transmitted to the wireless terminal by using said activated data transmission connection, if there is no activated data transmission connection for said wireless terminal, the next phase is to store the multimedia messages in the multimedia message server and wait until a data transmission connection is activated for said wireless terminal, to use it to transmit multimedia messages to said wireless terminal.

2. The method according to claim 1, wherein at the transmission stage, packets are formed of the multimedia messages, to be transmitted to the wireless terminal.

3. The method according to claim 1, wherein in the data transmission system, a data transfer protocol in a packet form, intended for e-mail transmission is used, wherein multimedia messages are formed into packets according to said data transfer protocol.

4. The method according to claim 3, wherein data of the type of the multimedia message is transmitted in the multimedia messages, wherein in the method it is possible to select which types of multimedia messages are transmitted in the activated data transmission connection.

5. The method according to claim 3, wherein multimedia messages are formed into packets according to an Internet protocol, which are framed at the transmission stage into packets according to a data transfer protocol intended for transmitting e-mail messages, and which packets are formed into packets according to the Internet protocol in said terminal.

6. The method according to claim 1, wherein information on deactivation of the data transmission connection activated for said wireless terminal is transmitted to the multimedia message server.

7. A system for transmitting multimedia messages to a wireless terminal comprising:

at least one mobile communication network;

at least one multimedia message server;

means for specifying an identifying address for each wireless terminal connected to the mobile communication network;

means for activating at least one data transmission connection for said wireless terminal; and means for transmitting a communication message to the multimedia message server informing the multimedia message server of the activation of a data transmission connection for said wireless terminal and for transmitting the multimedia messages to the wireless terminal over the data transmission connection in response to the communication message;

wherein the messages addressed to said wireless terminal are transmitted to the multimedia message server, and that before the multimedia messages received by the multimedia message server and addressed to the wireless terminal are transmitted to the wireless terminal, it is examined, whether there is an activated data transmission connection for said wireless terminal, if a data transmission connection is activated for said terminal, the multimedia messages are transmitted to the wireless terminal by using said activated data transmission connection, if there is no activated data transmission connection for said wireless terminal, the next phase is to store the multimedia messages in the multimedia message server and wait until a data transmission connection is activated for said wireless terminal, to use it to transmit multimedia messages to said wireless terminal.

8. The system according to claim 7, further comprising means for forming packets of the multimedia messages to be transmitted to the wireless terminal, means for transmitting packets addressed to said wireless terminal to the multimedia message server, and means for forwarding packets further by using said data transmission connection activated for the wireless terminal.

9. The system according to claim 8, further comprising means for using a data transfer protocol, in a packet format intended for transmitting e-mails, wherein the multimedia messages are arranged to be formed into packets according to said data transfer protocol.

10. A system according to claim 8, further comprising at least one packet radio network, such as GPRS network.

11. A multimedia terminal which is intended to be used in the system according to claim 7, wherein the multimedia terminal comprises means for transmitting a data transmission connection activation request to the mobile communication network.

12. A multimedia message server, which is arranged to be connected to a multimedia message communication system having at least one wireless terminal, at least one mobile communication network, means for specifying an identifying address for each wireless terminal connected to the mobile communication network, means for activating at least one data transmission connection for said wireless terminal, the multimedia message server comprising:

means for receiving a notification that the data transmission connection has been activated including activation data on the data transmission connection, means for examining the activation data, and means for transmitting packets further by using said data transmission connection activated for the wireless terminal, wherein packets embodying multimedia messages addressed to said wireless terminal are transmitted to the multimedia message server, and that before the multimedia messages received by the multimedia message server and addressed to the wireless terminal are transmitted to the wireless terminal, it is examined, whether there is an activated data transmission connection for said wireless terminal, if a data transmission connection is activated for said terminal, the multimedia messages are transmitted to the wireless terminal by using said activated data transmission connection, if there is no activated data transmission connection for said wireless terminal, the next phase is to store the multimedia messages in the multimedia message server and wait until a data transmission connection is activated for said wireless terminal, to use it to transmit multimedia messages to said wireless terminal.

* * * * *

UNITED STATES PATENT AND TRADEMARK OFFICE
CERTIFICATE OF CORRECTION

PATENT NO. : 7,289,792 B1  Page 1 of 1
APPLICATION NO. : 09/318372
DATED : October 30, 2007
INVENTOR(S) : Turunen It is certified that error appears in the above-identified patent and that said Letters Patent is hereby corrected as shown below:

Title Pg, Item (56) column 2, line 9, after "Gaffney" delete "et al.".

Title Pg, Item (56) column 2, under U.S. Patent Documents, please add the following:
5,353,331 10/1994 Emery et al.......379/58

Title Pg, Item (56) column 2, under Foreign Patent Documents, please add the following:
WO 98/19438 5/1998
WO 96/38010 11/1996

Signed and Sealed this

Seventh Day of April, 2009

JOHN DOLL
*Acting Director of the United States Patent and Trademark Office*